(12) United States Patent
Kleman et al.

(10) Patent No.: US 7,532,155 B2
(45) Date of Patent: May 12, 2009

(54) RADAR LEVEL GAUGING SYSTEM

(75) Inventors: Mikael Kleman, Vreta Kloster (SE); Jan Westerling, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 302 days.

(21) Appl. No.: 11/401,104

(22) Filed: Apr. 10, 2006

(65) Prior Publication Data

US 2007/0236385 A1 Oct. 11, 2007

(51) Int. Cl.
*H01Q 17/00* (2006.01)
*G01S 13/00* (2006.01)
*G01F 23/00* (2006.01)

(52) U.S. Cl. .............................. 342/124; 342/1; 342/4; 342/188; 73/290 B

(58) Field of Classification Search ..................... 342/1, 342/4, 22, 59, 124, 188; 73/290 R, 290 B, 73/290 V, 291–334
See application file for complete search history.

(56) References Cited

U.S. PATENT DOCUMENTS

| | | | | |
|---|---|---|---|---|
| 4,765,186 A * | 8/1988 | Dieulesaint et al. | ........ | 73/290 V |
| 5,136,299 A * | 8/1992 | Edvardsson | ................. | 342/124 |
| 6,037,046 A * | 3/2000 | Joshi et al. | ................. | 428/212 |
| 6,184,818 B1 * | 2/2001 | Meinel | ........................ | 342/124 |
| 6,414,625 B1 * | 7/2002 | Kleman | ....................... | 342/124 |
| 6,765,524 B2 * | 7/2004 | Kleman | ....................... | 342/124 |
| 6,795,015 B2 * | 9/2004 | Edvardsson | ................. | 342/124 |
| 7,053,630 B2 * | 5/2006 | Westerling et al. | .......... | 324/644 |
| 7,075,479 B2 * | 7/2006 | Andersson | ................... | 342/124 |
| 7,099,662 B2 * | 8/2006 | Fuenfgeld et al. | ........... | 455/423 |
| 7,265,558 B1 * | 9/2007 | Penndal et al. | .............. | 324/637 |
| 7,304,601 B1 * | 12/2007 | Edvardsson et al. | ......... | 342/124 |
| RE40,128 E * | 3/2008 | Kielb | ......................... | 342/124 |
| 7,345,622 B2 * | 3/2008 | Edvardsson | ................. | 342/124 |
| 2004/0056791 A1 * | 3/2004 | Alford et al. | .................. | 342/26 |
| 2004/0145510 A1 * | 7/2004 | Edvardsson | .................... | 342/5 |

FOREIGN PATENT DOCUMENTS

| WO | WO 01/29523 | | 4/2001 |
|---|---|---|---|
| WO | WO 01/29523 A1 | * | 4/2001 |

\* cited by examiner

*Primary Examiner*—Thomas H Tarcza
*Assistant Examiner*—Peter M Bythrow
(74) *Attorney, Agent, or Firm*—Westman, Champlin & Kelly, P.A.

(57) ABSTRACT

A radar level gauging system comprising a microwave unit for transmitting and receiving first microwaves having a first and second distinguishable characteristics, a microwave absorber adapted to be arranged in a bottom region of the tank and adapted to absorb electromagnetic energy of microwaves having one of the first and second characteristics, and processing circuitry adapted to determine the product level based on a relationship between transmitted and received microwaves.

The system thus emits microwaves in two channels, and the absorber is arranged to absorb energy in only one of the channels. Using the absorbed channel, it is possible to obtain a measurement with very limited interference from the bottom, which thus will be accurate also for levels close to the bottom. Using the unabsorbed channel, it is possible to obtain a reference measurement of the distance to the reflecting part of the absorber, thus enabling verification of the of the system.

36 Claims, 5 Drawing Sheets

RADAR LEVEL GAUGING SYSTEM

FIELD OF THE INVENTION

The present invention relates to a radar level gauging (RLG) system for determining the level of a product in a tank based on a relationship between microwaves emitted into the tank and a reflection of these waves received from the tank.

BACKGROUND OF THE INVENTION

When using radar level gauging to determine the level of certain products, in particular products which are relatively transparent to microwaves, such as liquid gases, the bottom of the tank, which may be of a highly reflective material such as metal, may cause a relatively strong reflection, interfering with the surface reflection. In some situations, e.g. when the product surface is close to the bottom, this bottom reflection can make it difficult to determine the product level correctly.

A solution to this problem is presented in WO01/29523, disclosing an absorbing element to be arranged at the bottom of the tank, below the opening of a pipe used as a wave guide. Such a pipe is sometimes used to avoid reflection of the waves in structures present in the tank. The pipe also serves to provide an area of the product surface with less wave motion and turbulence, thus improving the quality of the surface reflection. Such pipe wave guides are used in various implementations where the surface reflection from the product is weak, e.g. in tanks containing liquid gases. The damping element disclosed in WO 01/29523 will serve to reduce or even eliminate any reflection in the bottom of the tank.

However, in some situations, it may be advantageous to acquire a reflection from a known position in the tank, e.g. to verify the RLG system. It may thus be undesirable to completely eliminate the bottom reflection.

OBJECT OF THE INVENTION

It is an object of the present invention to mitigate the problems caused by bottom reflections, while still enabling verification of the system.

GENERAL DISCLOSURE OF THE INVENTION

According to a first aspect of the present invention, this and other objects are achieved by a RLG system comprising a microwave unit for transmitting and receiving first microwaves having a first distinguishable characteristic, and second microwaves having a second distinguishable characteristic, an antenna connected to the microwave unit and adapted to emit the first and second microwaves to propagate towards the product, and to receive a reflection of the microwaves from a surface of the product, an microwave absorber adapted to be arranged in a bottom region of the tank and adapted to absorb electromagnetic energy of microwaves having one of the first and second characteristics, and processing circuitry adapted to determine the product level based on a relationship between transmitted and received microwaves.

The system thus emits two separately distinguishable types of microwaves, also referred to as emitting microwaves in two channels, and the absorber is arranged to absorb energy of one type of microwaves, i.e. in only one of the channels. Using the channel in which the microwaves are absorbed by the absorber (absorbed channel), it is possible to obtain a measurement with very limited interference from the bottom, which thus will be accurate also for levels close to the bottom. Using the other channel, in which the microwaves are not absorbed by the absorber (unabsorbed channel), it is possible to obtain a reference measurement of the distance to the reflecting part of the absorber, thus enabling verification of the the of the system.

When the product level is sufficiently high above the absorber, i.e. so high above the absorber that the reflection from the absorber will not interfere with the surface reflection, both channels will provide accurate level measurements. The verified, unabsorbed channel can then be used to verify the absorbed channel.

The term "microwaves" is here intended to include electromagnetic waves in the frequency range of approximately 3 GHz to approximately 150 GHz.

The term "bottom region" is used to indicate that the absorber is arranged below a level beneath which the product level is not expected to sink below. Preferably, the absorber is attached to the bottom of the tank.

The distinguishable characteristic of the microwaves may be polarization, e.g. waves having different, preferably orthogonal linear polarization, in which case the absorber is adapted to absorb microwaves of a given polarization.

Alternatively, the distinguishable characteristic of the microwaves may be frequency, in which case the absorber is adapted to absorb microwaves in a given frequency range.

According to one embodiment, the RLG system further comprises a tube arranged in the tank for guiding the microwaves, and the absorber is arranged beneath the opening of this tube. As mentioned above, such a tube may be used in cases where the surface reflection is weak and thus may be difficult to distinguish from disturbing reflections. The tube prevents the waves from propagating freely in the tank, thus avoiding reflections in tank structures. Due to the limited extension of the waves, the absorber only needs to occupy an area beneath the opening of the tube, making this an advantageous embodiment of the present invention. It should be emphasized, however, that the present invention by no means is limited to RLG systems including a wave guiding tube.

In one embodiment, the microwave unit comprises a first set of components for transmitting and receiving the first microwaves, and a second set of components for transmitting and receiving the second microwaves, wherein the first and second sets are functionally independent of each other, so that signals from one channel do not affect signals from the other channel, in order to provide redundant measurements fulfilling any security requirements. This makes the two microwave channels redundant, providing redundant level measurements, at least for product levels sufficiently high above the tank bottom, where both channels are undisturbed by bottom reflections.

According to a second aspect of the present invention, this and other objects are achieved by a microwave absorber comprising means for positioning said absorber in a fixed position in a bottom region of a tank, means for reflecting microwaves having a first polarization, and means for absorbing microwaves having a second polarization. Such a microwave absorber is suitable for realizing a system according to the first aspect of the invention.

According to one embodiment, such a microwave absorber comprises a plate of a material capable of absorbing electromagnetic energy of microwaves, and an elongated, electrically conducting member arranged to reflect microwaves with a polarization coinciding with an axial orientation of said member According to a third aspect of the present invention, this and other objects are achieved by a method for verifying a radar level gauging system adapted to emit and receive first microwaves having a first predetermined characteristic, and second microwaves having a second predetermined characteristic, and an absorber in a fixed position at a known distance from the antenna for absorbing electromagnetic energy of the first microwaves, the method comprising determining a distance to the absorber based on a reflection of unabsorbed microwaves from the tank, verifying the distance to the absorber based on the known distance, determining a first surface distance to a surface of a product in the tank, based on a reflection of absorbed microwaves from the tank, determining a second surface distance to a surface of the product, based on a reflection of unabsorbed microwaves from the tank, and verifying the first surface distance based on the second surface distance.

By using the two channels of the radar level gauging system in this way, the method will ensure accurate level gauging while at the same time enabling verification of the radar level gauging.

BRIEF DESCRIPTION OF THE DRAWINGS

This and other aspects of the present invention will now be described in more detail, with reference to the appended drawings showing currently preferred embodiments of the invention.

DETAILED DESCRIPTION OF PREFERRED EMBODIMENT

Figures 1, 2:
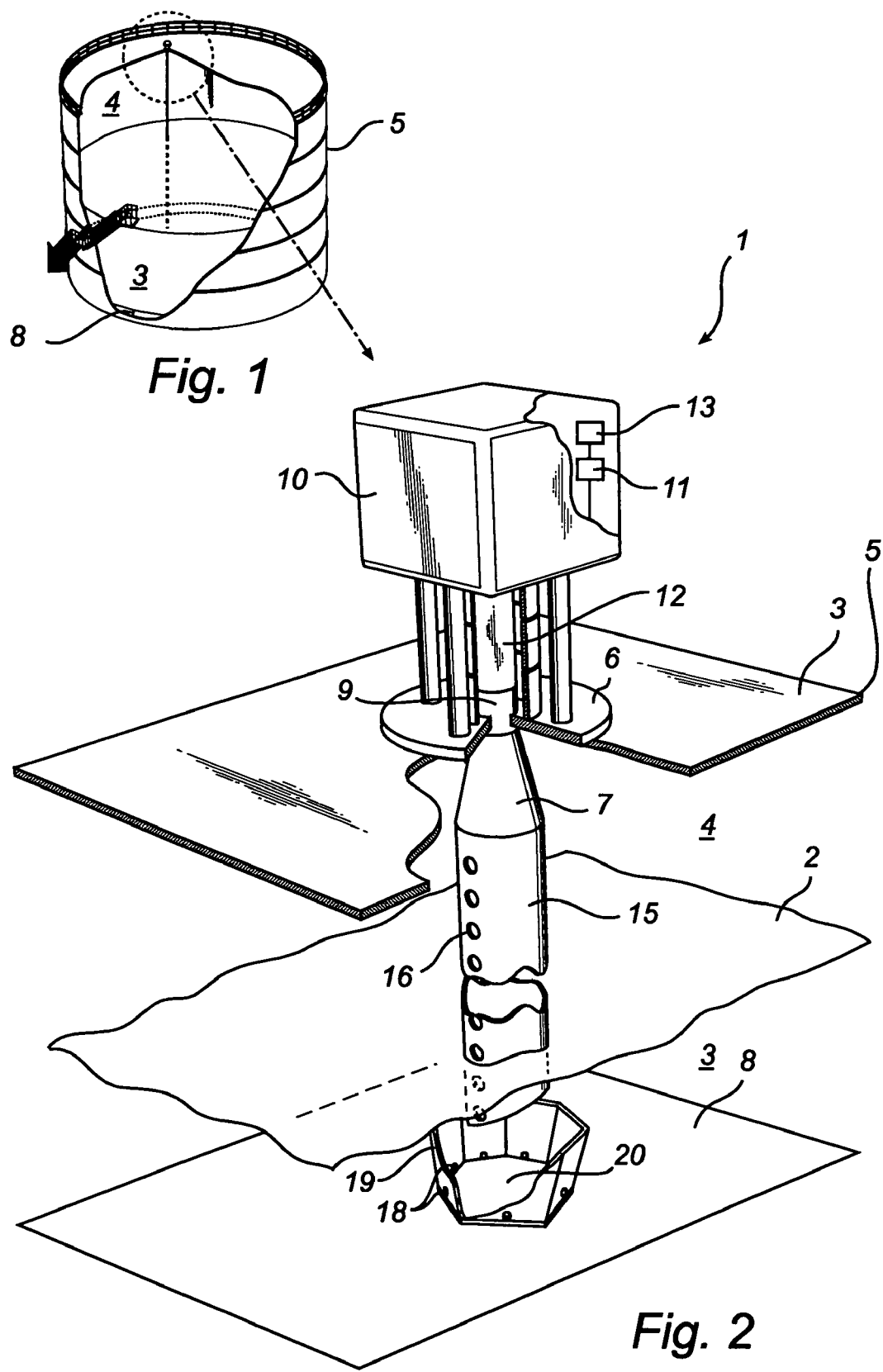
FIG. 1 is a perspective view of a tank equipped with a radar level gauging system according to the present invention.
FIG. 2 is a schematic perspective view of the radar level gauging system in FIG. 1 in greater detail.

FIGS. 1 and 2 show a radar level gauging system 1 according to an embodiment of the present invention. The RLG system 1 is arranged to perform measurements of a process variable in a tank 5, such as the level of an interface 2 between two (or more) materials 3, 4 in the tank 5. Typically, the first material 3 is a content stored in the tank, while the second material 4 is air or some other atmosphere. In that case, the RLG will enable detection of the level of the surface of the content in the tank. Typically, only the level of a first liquid surface is measured, or a second liquid surface if the first liquid is sufficiently transparent. The product can be an oil product, such as e.g. crude oil, a liquid petroleum gas (LPG), a liquid natural gas (LNG), other liquid hydrocarbons, or liquids in general which are at least partially transparent to microwaves. Propane and butane are two typical gases stored in condensed form as liquids.

As shown in more detail in FIG. 2, the tank 5 is provided with a fastening structure 6 securing an antenna 7 in a measuring position fixed relative the bottom 8 of the tank 5. The antenna, here in the form of a conical radar horn, is adapted to emit the waves into the tank 5, and to receive waves that are reflected by the interface 2. The fastening structure 6 is preferably coupled to a feed through structure 9, allowing microwaves to pass to and from the antenna 7 through the upper boundary of the tank 5. This feed through structure can be wave guide provided with a gas tight sealing capable of withstanding temperature, pressure, and any chemicals contained in the tank.

A RLG unit 10 is rigidly mounted onto the fastening structure. The unit 10, which is shown with its outer wall partly removed, to schematically show a microwave unit 10 and processing circuitry 13. The microwave unit 11 includes transceiver circuitry arranged to generate electromagnetic signals, and a probe for exciting these signals into freely propagating waves. These elements will be described more in detail with reference to FIGS. 2-5. In the illustrated example, where the waves are excited above the antenna, the waves are fed to the antenna 7 by a waveguide 12 through the feed through structure 9. Waves received by the antenna 7 are fed back to the transceiver circuitry 10 as electromagnetic signals.

The processing circuitry 13 is arranged to control the microwave unit 10, and to determine a measurement result based on a relation between transmitted and received signals.

The microwave unit 11 is arranged to transmit first and second microwaves having a first and a second characteristic, respectively, so as to transmit microwaves in two separate channels, where the waves in each channel are distinguishable when they propagate in the tank. According to one embodiment, the transceiver circuitry comprises two probes, for exciting microwaves having different (preferably orthogonal) linear polarization. It may also be possible to use circular polarization (left and right).

In the illustrated example, the RLG system 1 is further provided with a vertical tube 15 extending vertically into the tank from the antenna 7 to a position a distance, e.g. in the order of dm, from the bottom of the tank. The tube 15 is arranged to act as a waveguide, so as to prevent emitted waves from being reflected in structures in the tank.

The tube 15 is preferably of a metallic material to be capable of acting as a waveguide for microwaves and may have an arbitrary cross-sectional shape. However, a circular, rectangular, or super-elliptical cross-section is preferred. The tube is provided with a number of relatively small openings 16 in its wall, which makes possible the communication of the fluid from the container to the interior of the tube, so that the level of the liquid is the same in the tube as in the container. The size and locations of the holes are chosen so that they do not disturb the wave propagation but still allow the interior and exterior liquid level to equalize sufficiently fast.

The tube is attached to the lower edge of the cone of the antenna 7. In the case of a metal tube 15 and metal antenna 7 they can be joined by welding.

The RLG system further comprises a microwave absorber 20, here arranged below the lower opening of the tube. The absorber 20 here covers the entire projection of the tube on the bottom, and is arranged to absorb (completely or partially) microwaves in one of the channels, i.e. microwaves having one of the characteristics. In the present case, where the channels are characterized by waves having different polarization, the absorber is adapted to absorb microwaves having a given polarization, and is aligned with the microwave unit 11 in such a way that electromagnetic energy of microwaves in one channel is absorbed while electromagnetic energy of microwaves in the other channel is not absorbed. The absorber 20 serves to eliminate or reduce any reflection from the bottom of the tank in the absorbed channel.

The absorber can be attached to the bottom of the tank in a suitable way, for example by an adhesive or by mechanical fastening means such as screws. It may also be suspended just above the bottom surface, by a suitable suspension arrangement (not shown).

Optionally, the absorber 20 can be enclosed by a sheltering device 19, arranged to reduce turbulence and wave motion close to the absorber 20. The sheltering device 19 can form a collar around the absorber 20. It is here shown as integrated with the absorber 20, so as to form a bucket-like form, and is provided with drainage holes 18 along its bottom edge to allow drainage of product when the product level falls below the rim of the sheltering device 19.

In use, the processor circuitry controls the transceiver to generate and transmit a measurement signal to be emitted into the tank 5 by the antenna as free propagating waves. The signals generated by the transceiver can be DC pulses with a length of about 2 ns or less, with a pulse repetition frequency in the order of MHz, and modulated on a carrier of a GHz frequency (microwaves). An average power levels can be in the mW or μW area. In the case of Frequency Modulated Continuous Wave (FMCW) gauging, the signal can be a continuous signal with a frequency varying over a certain range (Frequency Modulated Continuous Wave, FMCW).

Waves reflected from the tank interior and any contents therein, or a mix of emitted and reflected waves, are received by the antenna, and supplied to the transceiver as an electromagnetic signal. This signal is received and used to generate a tank signal, including information about transmitted and received signals. A digitized version of this tank signal is then provided to the processor, which determines a measurement result based on a relation between the transmitted and received signals. The process includes identifying and locating peaks in the tank signal corresponding to surface echoes. The measurement result is used to calculate the product level in the tank, i.e. the distance from the bottom of the tank to the product surface 2.

Measurements performed using the channel whose waves are absorbed by the absorber 20 will provide accurate results even when the product level is close to the bottom, as reflections from the bottom surface are reduced and do not interfere with the surface echoes. Measurement performed with the other channel will on the other hand enable detecting the bottom reflection, which may be useful for verification of the system.

In a conventional RLG system, a reflection from a known position, e.g. the bottom of the tank, may be used to verify the system. If the distance to the bottom determined by the reflection from the bottom corresponds to the known distance, then it can be assumed that the system is accurate. Such verification is typically performed before the tank is filled with a product.

Figure 3:
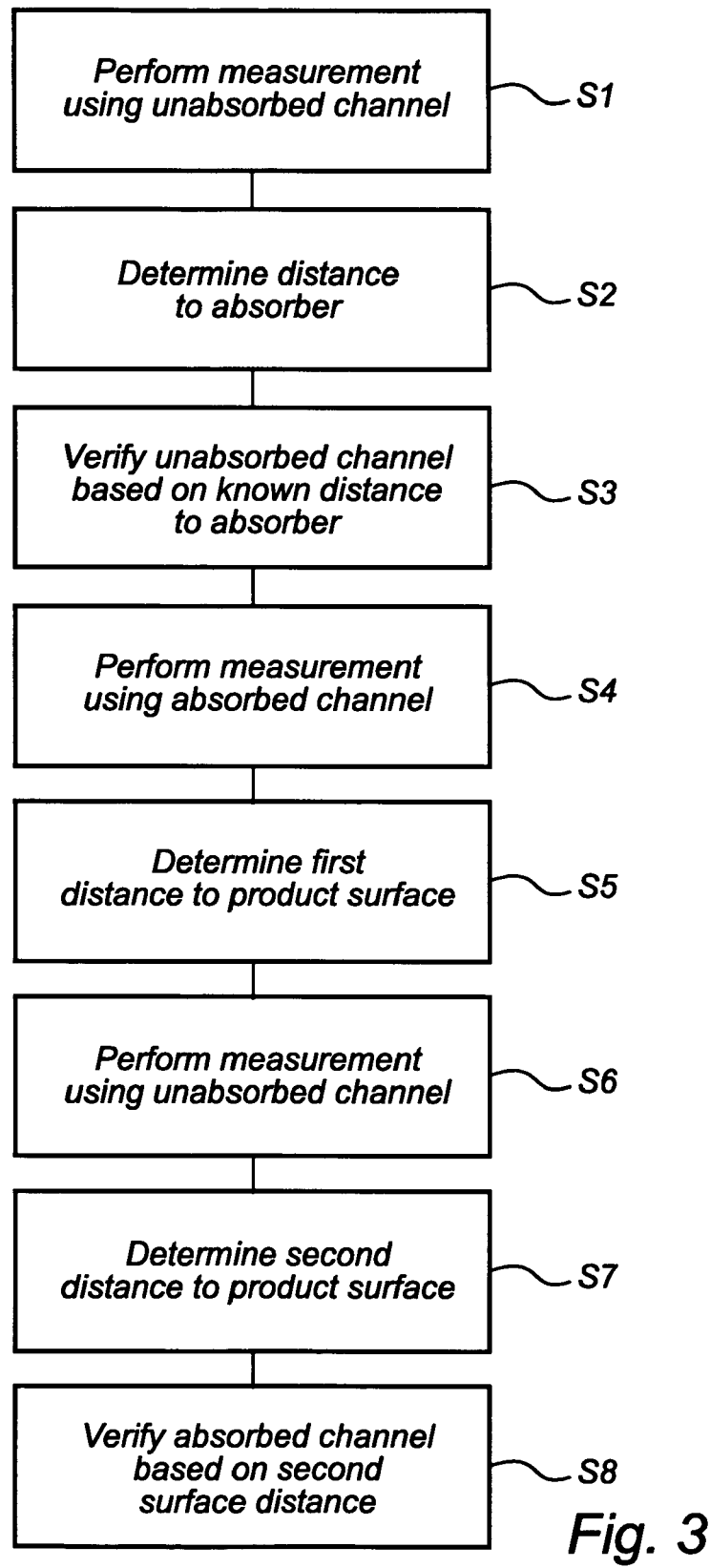
FIG. 3 is a flow chart of a verification process according to an embodiment of the invention.

FIG. 3 shows a flow chart of a verification process according to an embodiment of the present invention. First, before the tank is filled with a product, the system can be verified in respect of the microwaves that are reflected by the absorber 20 (i.e. the unabsorbed channel). This part of the process comprises performing a measurement using the unabsorbed channel (step S1) and determining a distance to the absorber (step S2). This distance to the absorber, which is located in a fixed position, known to the system, can now be used to verify the unabsorbed channel (step S3), in a way similar to that described above.

Then, during use of the system, preferably in a situation when the product level is sufficiently high above the absorber to ensure that accurate measurement results are obtained also using the unabsorbed channel, the system can be verified in respect of the microwaves that are absorbed by the absorber 20 (absorbed channel).

Here a measurement using the absorbed channel is performed (step S4). This measurement will provide a reflection from the surface, and a first distance to the product surface can be determined (step S5). Then, another measurement is performed using the unabsorbed channel (step S6), and a second distance to the surface can be determined (step S7).

The second distance to the surface acquired by the previously verified, unabsorbed channel can then be used to verify the absorbed channel (step S8).

It should be noted that the distance to the absorber 20 is determined by the part of the absorber that is adapted to reflect microwaves in this channel, and that it is the distance to this part that should be known to the system.

Figure 4:
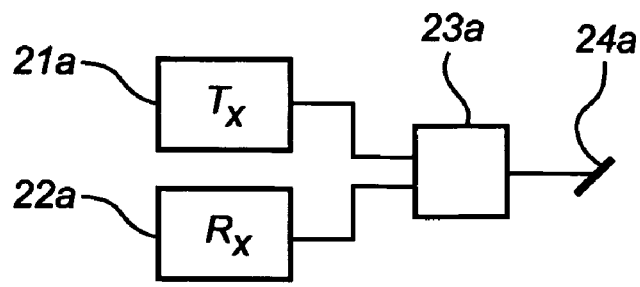
FIG. 4 is a schematic block diagram of a first embodiment of the microwave unit in the RLG system in FIG. 2.
Figure 4:
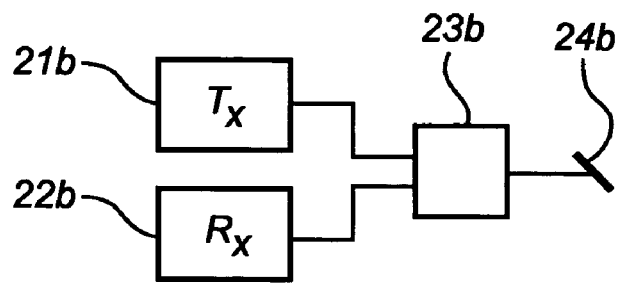

FIG. 4 shows an embodiment of the microwave unit 11 in FIG. 2, where the two channels of the microwave unit 11 are functionally separated, so that signals from one channel do not affect signals from the other channel, in order to provide redundant measurements fulfilling any security requirements. The separation can comprise galvanic isolation and/or any other isolation.

Each channel here comprises a transmitter 21*a*, 21*b*, a receiver 22*a*, 22*b*, a coupler 23*a*, 23*b* and a microwave probe 24*a*, 24*b* being adapted to excite waves of a specific polarization. The probes are preferably arranged to excite linearly polarized waves of two orthogonal polarization directions, and are as such well known in the art.

In operation, in each channel, the transmitter generates an electromagnetic signal, which is supplied via the coupler to the probe for exciting free propagating waves that are fed to the antenna. The antenna 7 receives a reflection from these waves, which excite the probe so as to generate a received electromagnetic signal which is received by the receiver.

Figure 5:
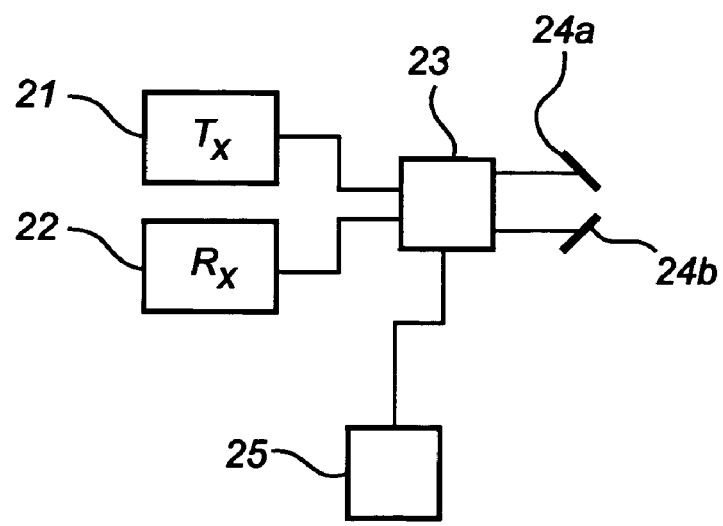
FIG. 5 is a schematic block diagram of a second embodiment of the microwave unit in the RLG system in FIG. 2.

FIG. 5 shows a further embodiment of the microwave unit 11 in FIG. 2, where some of the transceiver circuitry is common for both channels. Each channel again comprises two microwave probes 24*a*, 24*b*, for exciting free propagating waves of different polarization in a wave guide, but in this case these probes share the same transmitter 21, receiver 22 and coupler 23. The circuitry is controlled by a timing circuit 25.

In operation, the coupler 23 is controlled by the timing circuit 25 to be connected alternatingly to the two probes 24*a*, 24*b*. This ensures association of transmitted signals in one channel with corresponding received signals in the same channel.

Figure 6:
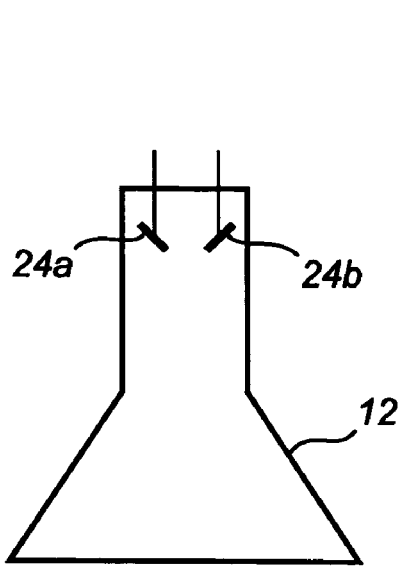
FIG. 6 is a schematic block diagram of a part of the RLG in FIG. 2, according to a first embodiment.

According to one embodiment, shown in FIG. 6, the two probes 24*a*, 24*b* of the microwave unit 10 are arranged directly in the antenna 7. This is a simple design, but has the drawback of requiring a specifically designed antenna.

Figure 7:
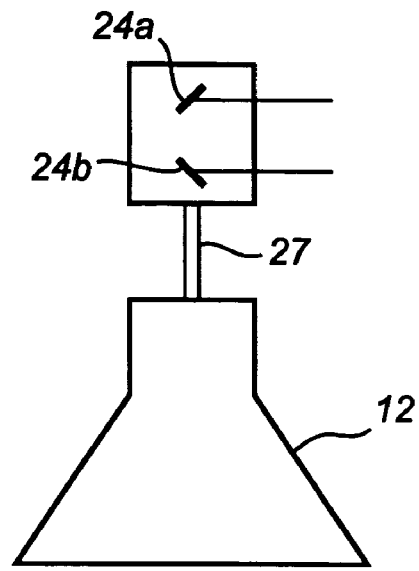
FIG. 7 is a schematic block diagram of a part of the RLG in FIG. 2, according to a second embodiment.

According to another embodiment, shown in FIG. 7, the two probes 24*a*, 24*b* form part of a power divider 26, for example as described in U.S. Pat. No. 6,765,524, herewith incorporated by reference. Free propagating waves are excited in the power divider 26, and then fed to the antenna by output 27. This solution has the advantage that a standard antenna, with a wave guide connector, can be used.

Figure 8:
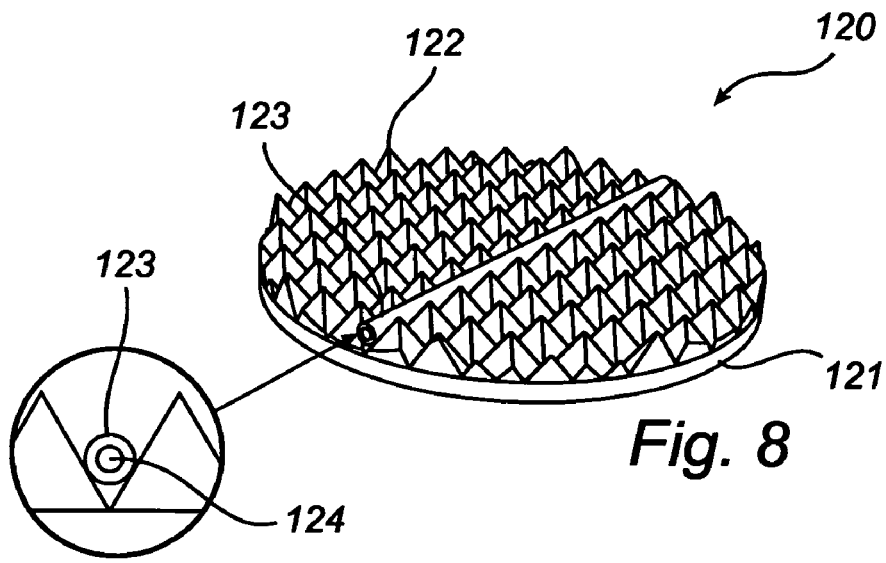
FIG. 8 is a schematic perspective view of a first embodiment of an absorber according to the invention.

A first embodiment of an absorber 120 according to the invention is shown in FIG. 8. The absorber here comprises a plate 121 of a material that absorbs electromagnetic energy, in particular microwave energy. Examples of such materials include plastic materials such as PTFE, and silicon rubber, e.g. Eccosorb ® MFS. This material can optionally be coated by a protective cover, e.g. of high density polyethylene. In order to avoid any reflection in the interface between tank content and absorber material, the plate is formed to have a cross section in a plane normal to a direction of incidence of microwaves that decreases with the vertical position, i.e. towards the antenna. In other words, the cross section is smaller in a position closer to the antenna, and then increases to become larger closer to the bottom. In the illustrated example, this is accomplished by forming the upper surface of the plate as a pattern of spikes, here standing pyramids 122. The cross section discussed is then formed by the aggregated cross sections of these pyramids, and increases from a set of points (the tips of the pyramids) to the full cross section of the plate (the bases of the pyramids). Details of design of such an absorber may be found in WO01/29523, herewith incorporated by reference.

In order to reflect waves having a given polarization, the absorber is provided with a conducting elongated member 123, e.g. a metal bar or rod with a diameter in the order of $\lambda/10$, where $\lambda$ is the wavelength of the microwaves, ensuring reflections of microwaves in a polarization plane parallel to the rod. The rod is here arranged so that its axial orientation coincides with the linear polarization of waves in one of the channels. The rod 123 is preferably arranged in a groove between two rows of pyramids 122, on a suitable distance from the bottom of the groove. In order to ensure a suitable distance, the rod 123 can be coated with a non-conducting, e.g. plastic, layer 124, to ensure a suitable placement in the groove (i.e. no too deep down between the pyramids).

The rod 123 should have an axial length at least corresponding to $\lambda/2$, but can extend across the entire plate 121, or even further.

Figure 9:
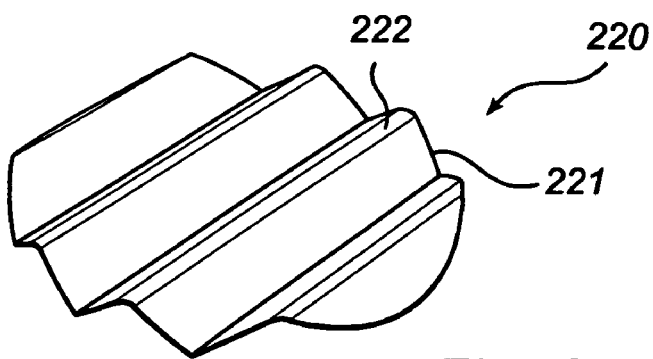
FIG. 9 is a schematic perspective view of a second embodiment of an absorber according to the invention.

A second embodiment of an absorber 220 according to the invention is shown in FIG. 9. In this case, the absorber comprises one or several metal sheets 221 bent to form a pointed ridge 222. Waves having a polarization coinciding with the longitudinal extension of the ridge will be reflected, while waves having a polarization perpendicular to the ridges will be reflected in the sloping sides of the ridge. The curvature of t3eh ridges, and the slope of the sides of the ridges are chosen such that waves reflected by these sides will not enter the opening of the tube, and will thus not reach the antenna. Depending on the required slope, it may be necessary to provide several bent metal sheets next to each other, in order to cover the entire projection of the tube opening.

Figure 10:
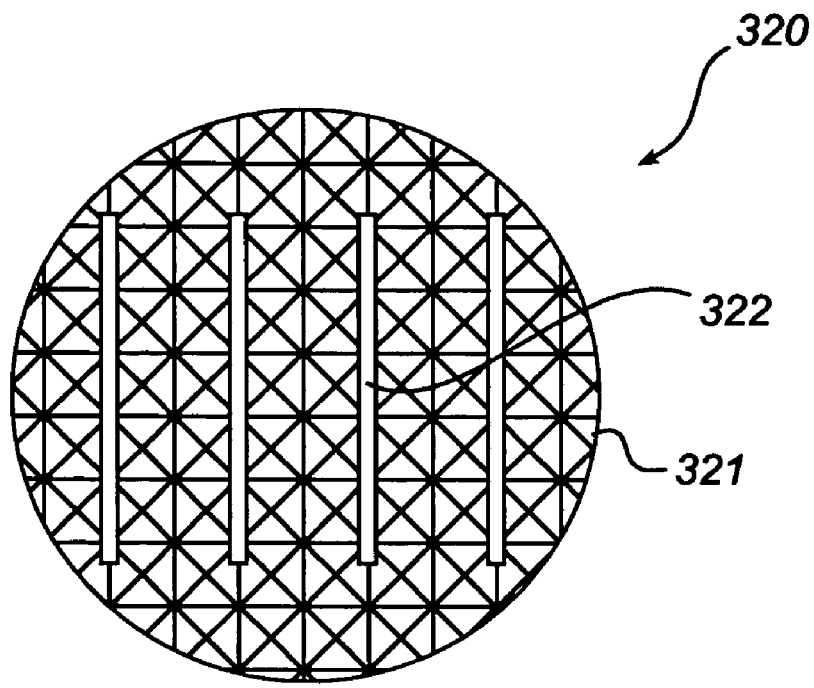
FIG. 10 is a schematic top view of a third embodiment of an absorber according to the invention.
Figure 11:
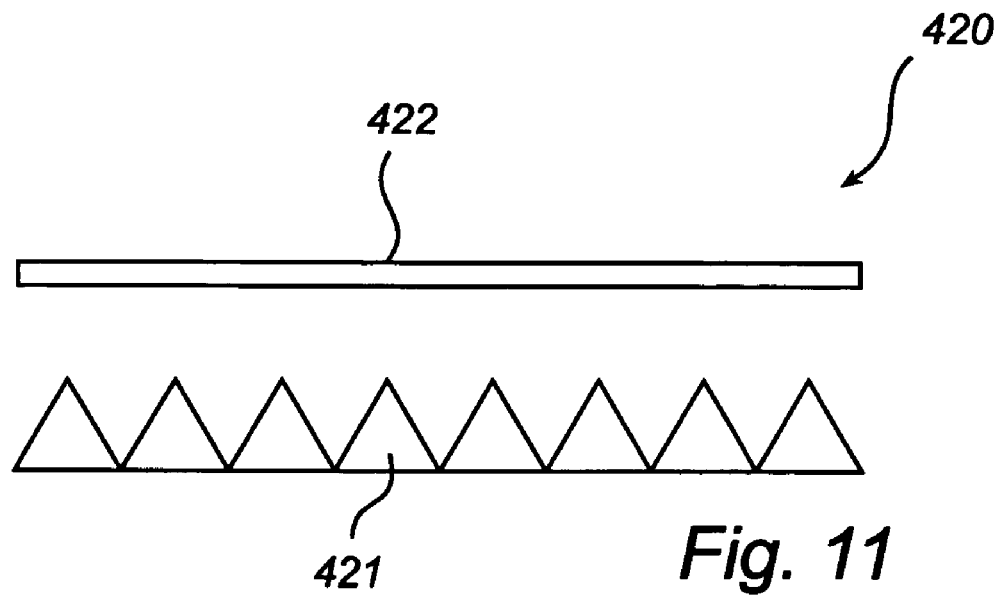
FIG. 11 is a schematic side view of a fourth embodiment of an absorber according to the invention.

A further embodiment of an absorber 320 is shown in FIG. 10. Here, similar to the embodiment in FIG. 8, the absorber comprises a plate 321 of microwave absorbing material formed with pyramids. In this case, the plate is provided with a plurality of slits 322, with an orientation coinciding with the polarization of the waves that are to be reflected.

The absorber 320 is adapted to be arranged in a bottom region of a tank, so that the reflecting bottom surface of the tank will be visible through the slits and provide reflection of waves having a particular linear polarization.

Yet a further embodiment of an absorber 420 is shown in FIG. 12. In this case, a plate 421 of microwave absorbing material formed with pyramids, similar to that in FIG. 8 and 10, is arranged beneath a reflecting polarizer 422. The polarizer will ensure that microwaves having the desired polarization are reflected, while microwaves of an orthogonal polarization are transmitted. These waves are subsequently absorbed by the plate 421.

In the description above, the channels are distinguishable by different polarization. However, the invention is not limited to this concept, and other ways to distinguish the channels may be envisaged. For example, different frequencies may be utilized, in which case the absorber 20 is adapted to dampen waves having a frequency in a certain frequency range.

What is claimed is:

1. A radar level gauging system for determining a level of a product in a tank, comprising:
   a microwave unit for transmitting and receiving first microwaves having a first distinguishable characteristic, and second microwaves having a second distinguishable characteristic,
   an antenna connected to said microwave unit and adapted to emit said first and second microwaves to propagate towards the product, and to receive a reflection of said microwaves from a surface of said product,
   an microwave absorber adapted to be arranged in a bottom region of said tank and adapted to absorb electromagnetic energy of microwaves having a selected one of said first and second characteristics, and
   processing circuitry adapted to determine said product level based on a relationship between transmitted and received microwaves.

2. The radar level gauging system according to claim 1, wherein said absorber is adapted to reflect microwaves having one of said first and second characteristics.

3. The radar level gauging system according to claim 1, wherein said absorber is adapted to be attached to a bottom surface of said tank.

4. The radar level gauging system according to claim 1, wherein said absorber is adapted to be suspended in close proximity to a bottom surface of said tank.

5. The radar level gauging system according to claim 1, wherein said first microwaves have a first polarization, and said second microwaves have a second polarization, and wherein said absorber is adapted to absorb electromagnetic energy of microwaves having said first polarizations.

6. The radar level gauging system according to claim 5, wherein said first and second microwaves are linearly polarized.

7. The radar level gauging system according to claim 5, wherein said first and second microwaves are orthogonally polarized.

8. The radar level gauging system according to claim 1, wherein first microwaves have a first frequency, and said second microwaves have a second frequency, and wherein said absorber is adapted to absorb electromagnetic energy of microwaves in a given frequency range.

9. The radar level gauging system according to claim 1, further comprising a tube arranged in the tank for guiding said microwaves, said absorber being arranged beneath an opening of said tube.

10. The radar level gauging system according to claim 1, wherein said microwave unit comprises a first set of components for transmitting and receiving said first microwaves, and a second set of components for transmitting and receiving said second microwaves, said first and second set being functionally independent of each other.

11. The radar level gauging system according to claim 10, wherein said first and second sets of components are galvanically isolated from each other.

12. The radar level gauging system according to claim 1, wherein said microwave absorber comprises a plate of a material capable of absorbing electromagnetic energy of microwaves, and means for reflecting microwaves having a given polarization.

13. The radar level gauging system according to claim 12, wherein said plate has a horizontal cross section that decreases with vertical position.

14. The radar level gauging system according to claim 13, wherein said plate is formed with a plurality of spikes having tips, said tips facing the antenna when said radar level gauging system is mounted in a tank.

15. The radar level gauging system according to claim 1, wherein said microwave absorber comprises a plate of a material capable of absorbing electromagnetic energy of microwaves, and at least one elongated, electrically conducting member arranged to reflect microwaves with a polarization coinciding with an axial orientation of said member.

16. The radar level gauging system according to claim 15, wherein said elongated member is located above the plate with a vertical distance to a surface of the plate.

17. The radar level gauging system according to claim 15, wherein said plate has a horizontal cross section that decreases with vertical position.

18. The radar level gauging system according to claim 17, wherein said plate is formed with a plurality of spikes having tips facing the antenna, and wherein said conducting member is arranged in between two rows of such spikes.

19. The radar level gauging system according to claim 1, wherein said microwave absorber comprises a plate of a material capable of absorbing electromagnetic energy of microwaves, and at least one elongated opening in said plate.

20. The radar level gauging system according to claim 1, wherein said microwave absorber comprises a plate of a material capable of absorbing electromagnetic energy of microwaves, and a reflective polarizer, arranged between said absorber and said antenna when said radar level gauging system is mounted in a tank.

21. The radar level gauging system according to claim 1, wherein said microwave absorber comprises at least one electrically conducting sheet, bent to form at least one ridge, said ridge arranged to reflect microwaves with a polarization coinciding with a longitudinal extension of said ridge.

22. The radar level gauging system according to claim 1, further comprising a sheltering device, adapted to shelter the absorber when mounted in a tank.

23. The radar level gauging system according to claim 22, wherein said sheltering device is formed as a collar, enclosing said absorber.

24. The radar level gauging system according to claim 22, wherein said sheltering device is integrated with the absorber.

25. A microwave absorber adapted to be arranged in a fixed position in a bottom region of a tank, comprising:
means for reflecting microwaves having a first polarization, and
means for absorbing electromagnetic energy of microwaves having a second polarization.

26. The microwave absorber according to claim 25, wherein said means for absorbing comprises a plate of a material capable of absorbing electromagnetic energy of microwaves.

27. The microwave absorber according to claim 26, wherein said plate has a horizontal cross section that decreases with vertical position.

28. The microwave absorber according to claim 27, wherein said plate is formed with a plurality of spikes having tips, said tips adapted to face an antenna when said absorber is mounted in a tank.

29. A microwave absorber adapted to be arranged in a fixed position in a bottom region of a tank, comprising:
a plate of a material capable of absorbing electromagnetic energy of microwaves, and
an elongated, electrically conducting member arranged to reflect microwaves with a polarization coinciding with an axial orientation of said member.

30. The microwave absorber according to claim 29, wherein said elongated member is located above the plate with a vertical distance to a surface of the plate.

31. The microwave absorber according to claim 30, wherein said member is provided with a non-conducting coating, arranged to abut said surface and to provide said vertical distance.

32. The microwave absorber according to claim 29, wherein said plate has a horizontal cross section that decreases with vertical position.

33. The microwave absorber according to claim 32, wherein said plate is formed with a plurality of spikes having tips facing the antenna, and wherein said conducting member is arranged in between two rows of such spikes.

34. A microwave absorber adapted to be arranged in a fixed position in a bottom region of a tank, comprising:
a plate of a material capable of absorbing electromagnetic energy of microwaves, and
at least one elongated opening in said plate, arranged to allow a surface of said tank to be visible through said opening, thereby providing reflection of microwaves having a particular linear polarization.

35. A microwave absorber adapted to be arranged in a fixed position in a bottom region of a tank, comprising:
a plate of a material capable of absorbing electromagnetic energy of microwaves, and
a reflective polarizer, arranged above said plate.

36. A method for verifying a radar level gauging system adapted to emit and receive first microwaves having a first predetermined characteristic, and second microwaves having a second predetermined characteristic, and an absorber in a fixed position at a known distance from said antenna for absorbing electromagnetic energy of said first microwaves, said method comprising:
determining a distance to said absorber based on a reflection of unabsorbed microwaves from the tank,
verifying said distance to said absorber based on said known distance,
determining a first surface distance to a surface of a product in the tank, based on a reflection of absorbed microwaves from the tank,
determining a second surface distance to a surface of said product, based on a reflection of unabsorbed microwaves from the tank, and
verifying the first surface distance based on the second surface distance.

* * * * *